United States Patent [19]

Nagorski

[11] 4,447,019
[45] May 8, 1984

[54] MAGNETIC TAPE CARTRIDGE WITH RESILIENT BELT DRIVING MEANS AND SEPARATE TAPE AND BELT IDLERS

[75] Inventor: Boguslaw A. Nagorski, San Jose, Calif.

[73] Assignee: Fuji Photo Film Co., Ltd., Kanagawa, Japan

[21] Appl. No.: 307,147

[22] Filed: Sep. 30, 1981

[51] Int. Cl.³ .................... G11B 15/26; G11B 23/04
[52] U.S. Cl. .................... 242/192; 242/199; 360/96.3
[58] Field of Search ............... 242/192, 197, 198, 199, 242/200; 360/90, 132, 96.3, 96.4

[56] References Cited

U.S. PATENT DOCUMENTS

| | | | |
|---|---|---|---|
| 3,154,308 | 10/1964 | Faulkner | 242/192 X |
| 3,544,038 | 12/1970 | Smith | 242/192 |
| 3,942,743 | 3/1976 | Jinsenji | 242/192 |
| 4,242,709 | 12/1980 | Stricker | 242/192 X |

Primary Examiner—Stuart S. Levy
Assistant Examiner—Scott J. Haugland
Attorney, Agent, or Firm—Sughrue, Mion, Zinn, MacPeak & Seas

[57] ABSTRACT

A tape cartridge has a roller driven continuous resilient belt which supports a wide thin tape when transported in the vincinity of video recording machine heads. The belt turns a tape take-up reel at a peripheral speed greater than the belt turns a tape supply reel thereby applying tension to the tape as it is transported past the heads. Since the belt both supports and supplies tension to the tape, tape bounce is minimized in the vicinity of the machine heads. Separate idlers guide the belt and tape from the supply reel to the machine heads, and separate idlers guide the belt and the tape from the heads to the take-up reel allowing a smooth take-up reel to be built as the tape is transported.

8 Claims, 5 Drawing Figures

MAGNETIC TAPE CARTRIDGE WITH RESILIENT BELT DRIVING MEANS AND SEPARATE TAPE AND BELT IDLERS

CROSS-REFERENCES TO RELATED APPLICATIONS

This application is related to the application titled "Magnetic Tape Cartridge with Resilient Belt Driving Means" both applications being filed on the same date and assigned to the same assignee.

BACKGROUND OF THE INVENTION

1. Field of the Invention

The present invention relates to a magnetic tape cartridge or cassette having a resilient belt driving means and having separate tape and belt idlers. A magnetic tape cartridge is commonly referred to as a "cassette" and these terms as used herein are intended to mean the same thing.

2. Description of the Prior Art

Typical tape cartridges utilize tape which is 0.156 inches wide. Such tape is capable of storing only a limited amount of information. Recent tape recorders have been developed which require a tape cartridge which is capable of storing a much larger amount of information, as much as 120,000 bits per inch. To store this large amount of information, it has been proposed to use tape as wide as a quarter of an inch.

Recent video cassette recorders also require that the tape be transported at a relatively fast rate so that the desired amount of information can be adequately recorded and played back. Typical digital recording tape is generally 60 feet long and could provide 15 minutes of playing time. However, recent video recorders require as much as 300 feet of tape in order to provide 20 minutes of playing time. If such a long tape is to be used in a small cartridge, the tape must be extremely thin so that the size of the supply and take-up reels can be kept reasonably small.

Problems have been encountered in constructing a cartridge capable of transporting such a wide and thin tape. The tape tends to bounce in the vertical direction as it is transported past the machine heads. Tape bounce causes errors in recording and reading the tape especially when high recording densities are being used.

Prior art cartridges have attempted to minimize tape bounce by utilizing a resilient belt which attempts to turn the periphery of the tape take-up reel at a faster rate than it turns the tape supply reel in order to exert and maintain tension in the tape. FIGS. 1 and 2 show two such prior art cartridges.

In FIG. 1, a resilient belt 8 is driven in the direction of arrows 30 by a roller 26 which is driven by a recording machine capstan 28. The belt 8 passes around a portion 34 of a supply reel 6, around idlers 22 and 16, and around a portion 32 of a take-up reel 4. The stretching of the belt causes it to try to turn the periphery of the take-up reel at a rate faster than the periphery of the supply reel which applies tension to the tape as it is transported past the machine heads 33. The prior art cartridge shown in FIG. 2 is similar to that shown in FIG. 1 except that a floating idler 40 is used to guide the belt instead of fixed dual idlers 16 and 22 shown in FIG. 1.

These prior art cartridges have been found to be inadequate when a wide thin tape is utilized. Specifically, the tension supplied to the tape is insufficient to reduce the tape bounce to the degree required when very high recording densities are applied to the tape.

SUMMARY OF THE INVENTION

It is therefore an object of the present invention to provide a cartridge capable of transporting a wide and thin tape so that the bouncing of the tape is minimized in the vicinity of the machine heads;

It is a further object to provide a cartridge which is capable of applying tension to the tape as it is transported from the tape supply reel to the tape take-up reel;

A still further object is to provide a cartridge which is capable of building a smooth even take-up reel when transporting a wide thin tape.

Specifically, in accordance with the present invention, a cartridge for transporting a wide thin tape has a resilient belt, driven by a roller and guided by a plurality of idlers, which attempts to turn the periphery of the take-up reel at a speed greater than the speed at which the belt attempts to turn the periphery of the supply reel thereby applying tension to the tape. In addition, the belt is used to support the tape in the vicinity of the machine heads thereby minimizing tape bounce. Separate idlers guide the tape and the belt from the supply reel to the machine heads, and separate idlers guide the tape and the belt from the machine heads to the take-up reel allowing a smooth take-up reel to be built as the tape is transported.

DESCRIPTION OF THE PREFERRED EMBODIMENTS

Figure 1:
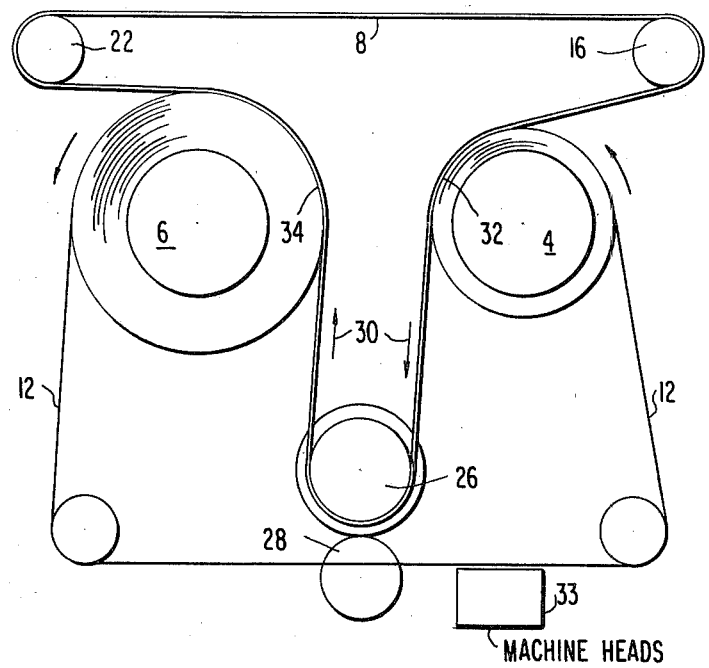
FIG. 1 shows a prior art cartridge utilizing a resilient belt for turning the tape supply and take-up reels.
Figure 2:
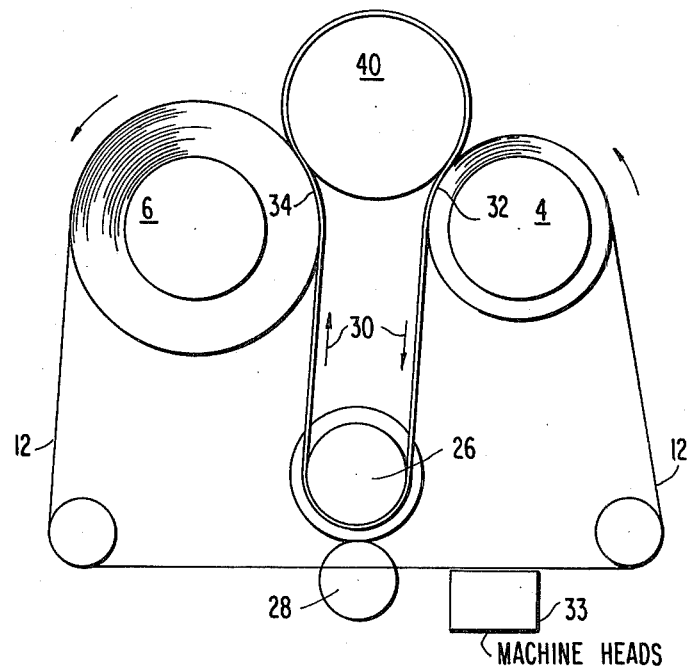
FIG. 2 shows a prior art cartridge similar to that shown in FIG. 1 except that a floating roller guides the belt rather than dual idlers.
Figure 3:
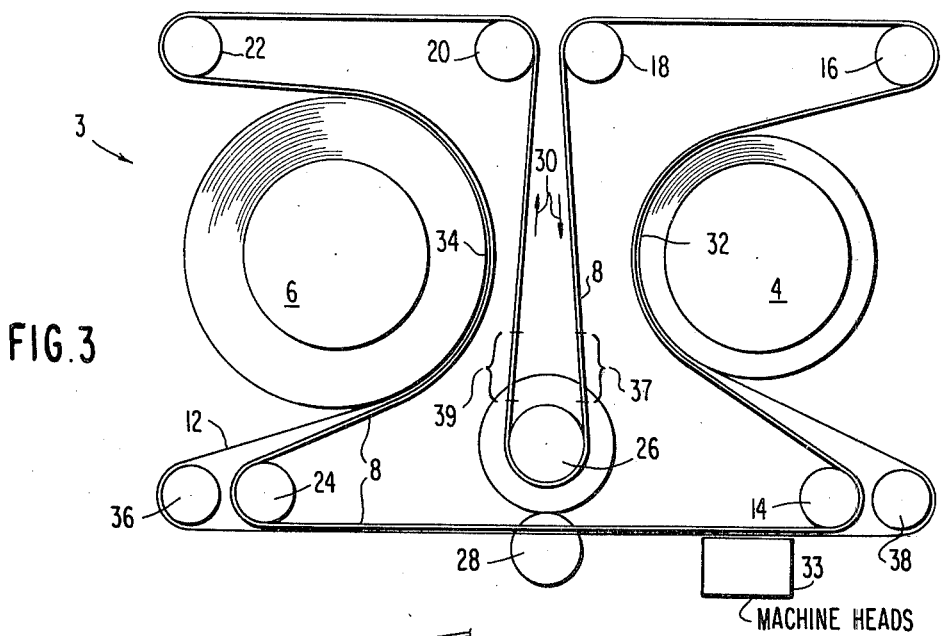
FIG. 3 shows a tape cartridge, built in accordance with the present invention, which has a resilient belt which supports the tape, and the cartridge is capable of building a smooth take-up reel.

Referring to FIG. 3, a tape cartridge 3 has a tape take-up reel 4 and a tape supply reel 6 for taking up and supplying a recording tape 12, shown as a solid thin line in FIGS. 1–4. An endless resilient belt 8, shown in FIGS. 1–5, is wrapped around a series of idlers 14, 16, 18, 20, 22, 24 as well as a drive roller 26. The roller 26 is adapted to be driven by a capstan 28 of a recording machine in a manner commonly known in the art. The roller 26 transports the belt 8 in the direction of arrows 30 when the tape 12 is transported in the forward direction. The roller 26 is also capable of driving the belt 8 in the direction opposite that of arrows 30 in which case reel 6 becomes the take-up reel and reel 4 becomes the supply reel.

As FIG. 3 indicates, rollers 14, 16 are disposed to the right of a portion 32 of the take-up reel 4 facing the center of the cartridge 3, and rollers 22 and 24 are disposed to the left of a portion 34 of the supply reel 6 facing the center of the cartridge 3. The belt 8 therefore passes around the portions 32, 34 of the take-up and supply reels 4, 6 as the belt 8 is driven by the roller 26 and capstan 28 thereby driving these reels. As the belt 8 drives the reels 4, 6, the tape 12 wound onto the supply reel 6 is transported to the take-up reel 4 and wound around this latter reel.

The tape 12 passes around idlers 36 and 38 as the tape is transported from the supply reel 6 to the take-up reel 4. As the tape 12 is transported from the idler 36 to the idler 38, the tape 12 comes in contact with read/write and erase machine heads 33 which record information onto the tape 12 or detect information previously recorded on the tape 12. As the tape 12 is transported between the idlers 36, 38, the tape 12 is in contact with and supported by the belt 8 thereby minimizing vertical tape bounce in the vicinity of the heads 33. The support provided by the belt 8 permits the use of an extremely thin tape 12.

Figure 4:
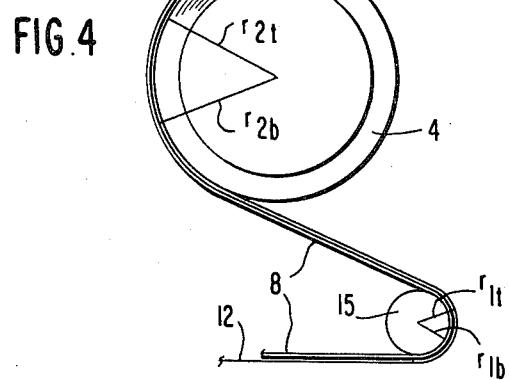
FIG. 4 shows a close-up view of the belt and the tape as they pass around a common idler to the take-up reel.

In FIGS. 3 and 4, a space is shown between the belt 8 and the tape 12 in the vicinity of the heads 33 for ease of illustration only. In actuality, no such space exists since the tape 12 is in constant contact with and is supported by the belt 8 in this region.

The belt 8 is wound around the idlers 14, 16, 18, 20, 22, 24 and the roller 26 under tension. When the belt is driven by the roller 26, additional tension is created in the belt 8 due to the pulling force exerted upon the belt 8 by the pulley 26. This pulling force causes the belt 8 to stretch since the belt 8 is made of a resilient material.

Since the pulling force is applied to the belt 8 by the pulley 26, the tension in the belt 8 is greatest in that section 37 of the belt 8 located immediately before the belt 8 contacts the pulley 26, and the tension in the belt continuously diminishes along the length of the belt, being a minimum in that section 39 of the belt 8 located immediately after the belt 8 contacts the pulley 26. Therefore, the tension in the belt 8 passing around the portion 32 of the take-up reel 4 exceeds the tension in the belt 8 passing around the portion 34 of the supply reel 6 which results in the belt 8 stretching more in the vicinity of the take-up reel 4 than in the vicinity of the supply reel 6.

Figure 5:
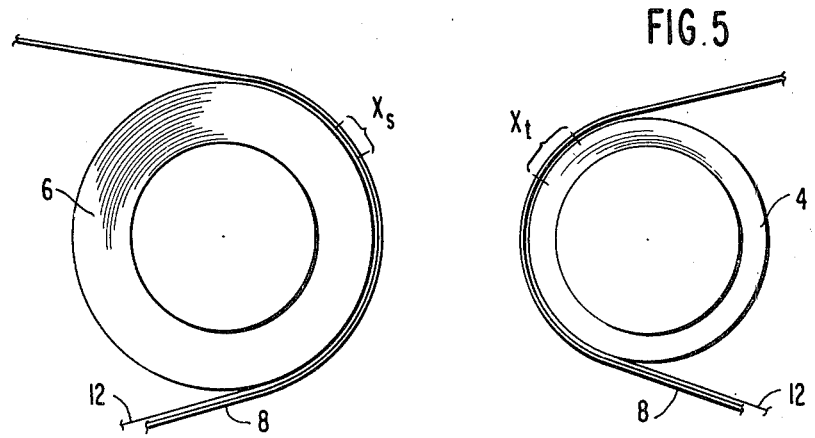
FIG. 5 shows segments of the resilient belt as it passes around portions of the take-up reel and supply reel.

As FIG. 5 shows, since the stretching of the belt 8 is greater around the take-up reel 4 than around the supply reel 6, a section $X_s$ of the belt 8 passing around the supply reel 6 is shorter than the same section $X_t$ of the belt 8 passing around the take-up reel 4. Accordingly, the belt attempts to impart a peripheral velocity $V_t$ to the take-up reel which exceeds the peripheral velocity $V_s$ the belt attempts to impart to the supply reel.

Since the reels are connected by a non-resilient tape, the actual peripheral velocities of the take-up reel 4 and the supply reel 6 are equal. Accordingly, slip occurs between the periphery of the take-up reel and the belt which provides tension to the tape 12 as it is transported from the supply reel to the take-up reel 4. This tension minimizes tape bounce in the vicinity of the heads 33 and prevents buckling of the tape 12 as it is wound around the take-up reel.

As previously indicated, the belt 8 supports the tape 12 as the tape 12 is transported from the supply reel 6 to the take-up reel 4 and past the heads 33. The support provided by the belt 8 permits very thin tapes 12 to be used for recording and playing information. Without the support provided by the belt 8, the tape is required to be relatively thick in order to possess enough stiffness to prevent excessive vertical tape bounce. The use of a relatively thick tape 12 requires either that the supply and take-up reels be extraordinarily large for a cartridge or that the tape 12 be relatively short and provide a small amount of continuous playing and recording time.

The belt 8 is required to be strong and have a certain amount of resilience. Polyurethane satisfies both these criteria. In addition, polyurethane also has a relatively high coefficient of friction which is desirable since the belt 8 must support and transport the tape 12 and turn the supply and take-up reels 6, 4. Other resilient materials can also be used for the belt 8, e.g., polyethylene, neoprene, or rubber.

In accordance with the present invention, separate idlers 24, 14 and 36, 38 are provided for guiding the belt 8 and the tape 12, respectively, away from the supply reel 6 and towards the take-up reel 4. If a common idler 15 shown in FIG. 4 is used to guide both the belt 8 and the tape 12 from the heads 33 towards the take-up reel 4, the tension in the tape 12 is not adequately maintained which allows the tape 12 to bounce to an undesirable degree in the vicinity of the heads 33. In addition, the tape buckles as it is wound around the take-up reel 4 which prevents the cartridge 3 from building a smooth take-up reel 4 as the tape is transported.

The problems created by guiding the belt 8 and the tape 12 around a common idler 15 can best be understood by referring to FIG. 4. As FIG. 4 clearly shows, the belt 8 moves around the idler 15 with a radius $r_{1b}$ which is less than the radius $r_{1t}$ of the tape 12 moving around this idler. However, the belt 8 moves around the take-up reel 4 with a radius $r_{2b}$ which is greater than the radius $r_{2t}$ of the tape 12 moving around the take-up reel 4. The differences between $r_{1b}$ and $r_{1t}$ and between $r_{2b}$ and $r_{2t}$ are extremely small, being approximately equal to the thickness of the tape 12. However, since the belt 8 and the tape 12 are moving at a relatively fast speed, these very small differences between these radii result in the tape 12 moving faster than the belt 8 around the idler 15 and moving slower than the belt 8 around the take-up reel 4. As a consequence, loss of tension, buckling and other related problems result. The use of the separate belt idler 14 and the separate tape idler 38 eliminates all these problems. Separate idlers 24 and 36 are also used to guide the belt 8 and the tape 12 as they are transported from the supply reel 6 to the machine heads 33 for the same reason.

What is claimed is:

1. A tape cartridge having a take-up reel and a supply reel for taking up and supplying a tape for use in a recording machine having heads, comprising:
    a continuous resilient belt, said belt supporting said tape in the vicinity of said machine heads;
    means for driving said belt so that said belt contacts a portion of said take-up reel and said supply reel causing said reels to turn;
    a first set of idlers for guiding said belt as said belt is transported from said portion of said supply reel to said portion of said take-up reel;
    a second set of idlers for guiding only said tape and not said belt as said tape and said belt are transported from said portion of said supply reel to said portion of said take-up reel.

2. The cartridge as claimed in claim 1 wherein,
    said first set of idlers comprises, a first belt idler and a second belt idler positioned to cause said belt to travel from a position in contact with said supply reel, around said first belt idler, past a position normally occupied by said machine heads, around said second belt idler and into contact with said take-up reel, said second set of idlers comrpises, a first tape idler and a second tape idler positioned outside and substantially in line with said first and second belt idlers to cause said tape to travel from said supply reel, around said first tape idler, past said first belt idler, in contact with said belt past a position normally occupied by said machine heads, past said second belt idler, around said second tape idler, and onto said tape-up reel.

3. The cartridge claimed in claim 1 wherein each of said first and second sets of idlers comprises at least two idlers, said first idler from each set being disposed in the vicinity of said supply reel and the second idler from each set being disposed in the vicinity of said take-up reel for separately guiding said belt and said tape away from said supply reel and towards said take-up reel.

4. The cartridge claimed in claim 3 wherein said means for driving said belt includes a roller adapted to be driven by said machine, a section of said belt passing around said roller contacting said portion of said supply reel before contacting said portion of said take-up reel, said roller applying tension to said belt causing said belt to stretch, said belt stretching more in the vicinity of said take-up reel than in the vicinity of said supply reel.

5. The cartridge claimed in claim 4 wherein said roller is capable of driving said belt in either a first direction or a second direction.

6. The cartridge claimed in claim 4 further comprising third and fourth belt idlers for guiding said belt, said third idler being disposed in the vicinity of said supply reel so that said belt passes around said portion of said supply reel when travelling between said third and first belt idlers, said fourth idler being disposed in the vicinity of said take-up reel so that said belt passes around said portion of said take-up reel when travelling between said second and fourth belt idlers.

7. The cartridge claimed in claim 6 further comprising fifth and sixth belt idlers for guiding said belt, said fifth idler guiding said belt from said fourth idler to said roller, said sixth idler guiding said belt from said roller to said third idler.

8. The cartridge claimed in claims 1, 3, 4, 5, 6, 7 or 3 wherein said belt comprises polyurethane.

* * * * *